United States Patent [19]
Kailash

[11] Patent Number: 5,951,648
[45] Date of Patent: Sep. 14, 1999

[54] RELIABLE EVENT DELIVERY SYSTEM

[75] Inventor: Kailash, San Jose, Calif.

[73] Assignee: Mylex Corporation, Fremont, Calif.

[21] Appl. No.: 08/810,013

[22] Filed: Mar. 3, 1997

[51] Int. Cl.[6] .............................. G06F 13/38; G06F 15/17
[52] U.S. Cl. ........................................... 709/237; 709/235
[58] Field of Search ........................... 395/200.53, 200.3,
395/680, 650, 200.09, 684, 200.33, 200.55;
340/825.54; 709/223, 200, 217, 203, 225,
237

[56] References Cited

U.S. PATENT DOCUMENTS

| | | | |
|---|---|---|---|
| 4,800,488 | 1/1989 | Agrawal et al. | 395/200.55 |
| 4,818,984 | 4/1989 | Chang et al. | 340/825.54 |
| 4,949,248 | 8/1990 | Caro | 395/200.33 |
| 4,977,499 | 12/1990 | Banning et al. | 364/200 |
| 5,345,396 | 9/1994 | Yamaguchi | 395/500 |
| 5,423,042 | 6/1995 | Jalili et al. | 395/684 |
| 5,442,749 | 8/1995 | Northcutt et al. | 395/200.09 |
| 5,560,008 | 9/1996 | Johnson et al. | 395/650 |
| 5,586,250 | 12/1996 | Carbonneau et al. | 395/183.2 |
| 5,600,793 | 2/1997 | Nord | 395/200 |
| 5,634,127 | 5/1997 | Cloud et al. | 395/680 |
| 5,689,708 | 11/1997 | Regnier et al. | 395/682 |
| 5,699,523 | 12/1997 | Li et al. | 395/200 |
| 5,706,437 | 1/1998 | Kirchner et al. | 395/200 |
| 5,748,892 | 5/1998 | Richardson | 395/200.3 |
| 5,761,421 | 6/1998 | van Hoff et al. | 395/200.53 |
| 5,774,668 | 6/1998 | Choquier et al. | 395/200.53 |

*Primary Examiner*—Mark H. Rinehart
*Attorney, Agent, or Firm*—Fish & Richardson P.C.

[57] ABSTRACT

A reliable event delivery system for use in a distributed event driven system in which one or more servers are each connected by a reliable communication transport system to a client station. Each server communicates event messages over a reliable transport system to the client station for execution. Receipt of the event messages at the client station transport protocol level is guaranteed by the reliable transport system. Guaranteed delivery at the client station's event execution level is achieved by the client station providing an event execution acknowledgment to the server. Another embodiment provides for secure and reliable event delivery by using a second transport system for use by the client station for requesting a confirmation from a server that an event message received over the first transport system was sent from the server and intended for the client.

21 Claims, 7 Drawing Sheets

RELIABLE EVENT DELIVERY SYSTEM

This invention relates to event driven distributed processing server-client systems in which a server transmits an event message to a remotely located client station for execution, and more specifically to a method for reliably delivering server-generated events to a client, and client-generated events to a server.

BACKGROUND

Modern multi-user server-client systems use event driven programs (processes) for time-multiplexing server system resources to run the applications of multiple users. Each process is subdivided into executable segments called threads. Each thread, when ready to execute may constitute (or trigger) an event. When a server process desires to have a client station execute a thread, the server transmits the thread (event) over an established network connection to the remote client station for execution. Events are used for many purposes, including: client paging, fax and e-mail transmissions, and for running user applications.

Reliability in communicating events is important for satisfactory operation of the server-client system. One concern is with the communication network reliability between the server and the client station site. A second concern to the server is whether the action required by the transmitted event has been executed.

An example of a server client relationship in which reliability of event delivery is important is in a service and maintenance context. In a service-maintenance system, a facility may have a service arrangement with a remote service center. When the facility requires service, it requests service from the remote service center. The service center is expected to respond in a timely fashion and provide the service requested. In this case, the requesting facility acts as the event server by sending a service request message (event) to the remote service center (client) using a reliable communication system.

Network communication reliability is governed by the particular protocol used by the communication network. Many well-known standard protocols exist that can provide a variety of reliability levels. For example, TCP/IP (Transmission Control Protocol/Internet Protocol) is the standard Internet reliable protocol for the transfer of data between two computers. TCP/IP uses delivery acknowledgment messages from the network destination node to the source node for providing reliable network node-to-node delivery at the transport network protocol level. Other event notification delivery systems are based on SNMP (Simple Network Management Protocol) or DMI (Desktop Management Interface) protocol, and use UDP (User Datagram Protocol), an unreliable method for delivering an event. UDP uses a "checksum", or bit-parity, for data error checking. However, UDP is unreliable because it does not guaranty delivery of a message. UDP can lose data packets if the client station is not ready to receive a message, if a connection fails, or if the communication network is overloaded.

At times, a server must broadcast an event to more than one client station and needs to know which client stations received the broadcast message in order to avoid server hang-ups. Server hang-ups result when the server does not know if the client station has received all pertinent prior events. (For example, server hang-ups can be caused by a client station having its software crash, having its memory requirement exceed available capacity, or having its processor unit fail.) Normal point-to-point server-client transmission of events using reliable protocols such as TCP/IP do not provide the degree of reliability required for the efficient and effective operation of an event driven system because no indication is given to the server that the message was received and operated on by the client station. Typically, network delivery systems only assure that a message has been successful transmitted from the server network node and that message was received by the network destination node used by the client station.

SUMMARY OF THE INVENTION

In general, in one aspect, the invention features a method for reliable event delivery in a distributed event driven system in which one or more servers are each connected by a reliable communication transport system to a client station, the method including the step of communicating an event message over a reliable transport system from a server to a client station for execution. The client station acknowledges receipt of the event message at a client station transport protocol level. Thereafter, the client station delivers the event message to the client station execution level. The client station execution level acknowledges the execution of the event message by the client station execution level by providing an event-execution acknowledgment back to the server.

Preferred embodiments of the invention include one or more of the following features. The step of communicating the event message includes storing the event message in the server. The stored event message is removed upon receipt of a corresponding event-execution acknowledgment. The method further includes the steps of providing a second transport system for communicating between the server and the client station. Prior to delivering the event message to the client station execution level, the client station sends a confirmation request to the server on the second transport system. The server acknowledges the confirmation request by sending a confirming event message from the server to the client station on the reliable transport system.

In another aspect, the invention features a distributed process system including a client workstation, a reliable transport system and an application server. The application server includes an event generator for generating event messages for execution in the client workstation, a message protocol driver for formatting and interpreting event messages, and a transport system protocol driver connected to the reliable transport system for requesting execution of an event by the client workstation by communicating event messages to the client workstation over the reliable transport system. The client workstation includes a transport system protocol driver connected to the reliable transport system, an input/output device protocol driver and a client application for executing events and for generating acknowledgment messages that are to be sent to the application server upon receipt of an event message and execution of an associated event.

Preferred embodiments of the invention include one or more of the following features. The distributed process system includes a buffer memory for storing information descriptive of each event message.

In another aspect, the invention features a method for reliable delivery of an event between an event generator and an event receptor including the step of sending an event message from the event generator to the event receptor on a reliable transport system, including delivering and acknowledging receipt of the event at an event receptor's reliable transport system protocol driver level. The event message is received at the event receptor and interpreted and acknowledged by sending an acknowledgment message back to the event generator over the reliable transport system. The event generator receives and verifies the validity of the acknowledgment message by confirming that the acknowledgment message conforms to a reliable transport system protocol.

In another aspect, the invention features a method of reliable event delivery in a distributed event driven system. The system includes a server having a RAID array and a client workstation for servicing the RAID array in the event of a failure in the array. The method includes the steps of detecting a failure in the RAID array and generating an event message in response to the failure at the server. The event message is communicated over a reliable transport system from the server to a client station for execution. Receipt of the event message is acknowledged at the client station at a client station transport protocol level. Thereafter, the event message is delivered to a client station execution level. The execution of the event message is acknowledged by providing an event-execution acknowledgment back to the server.

One advantage of the invention is that application server hang-up conditions are minimized because events to be serviced are acknowledged upon execution at the client workstation.

Another advantage of the invention is that rogue service requests from unauthorized application servers may be readily identified thereby minimizing the unnecessary commitment of client workstation resources.

Other advantages and features will be apparent from the following description and claims.

DETAILED DESCRIPTION OF THE INVENTION

Figure 1:
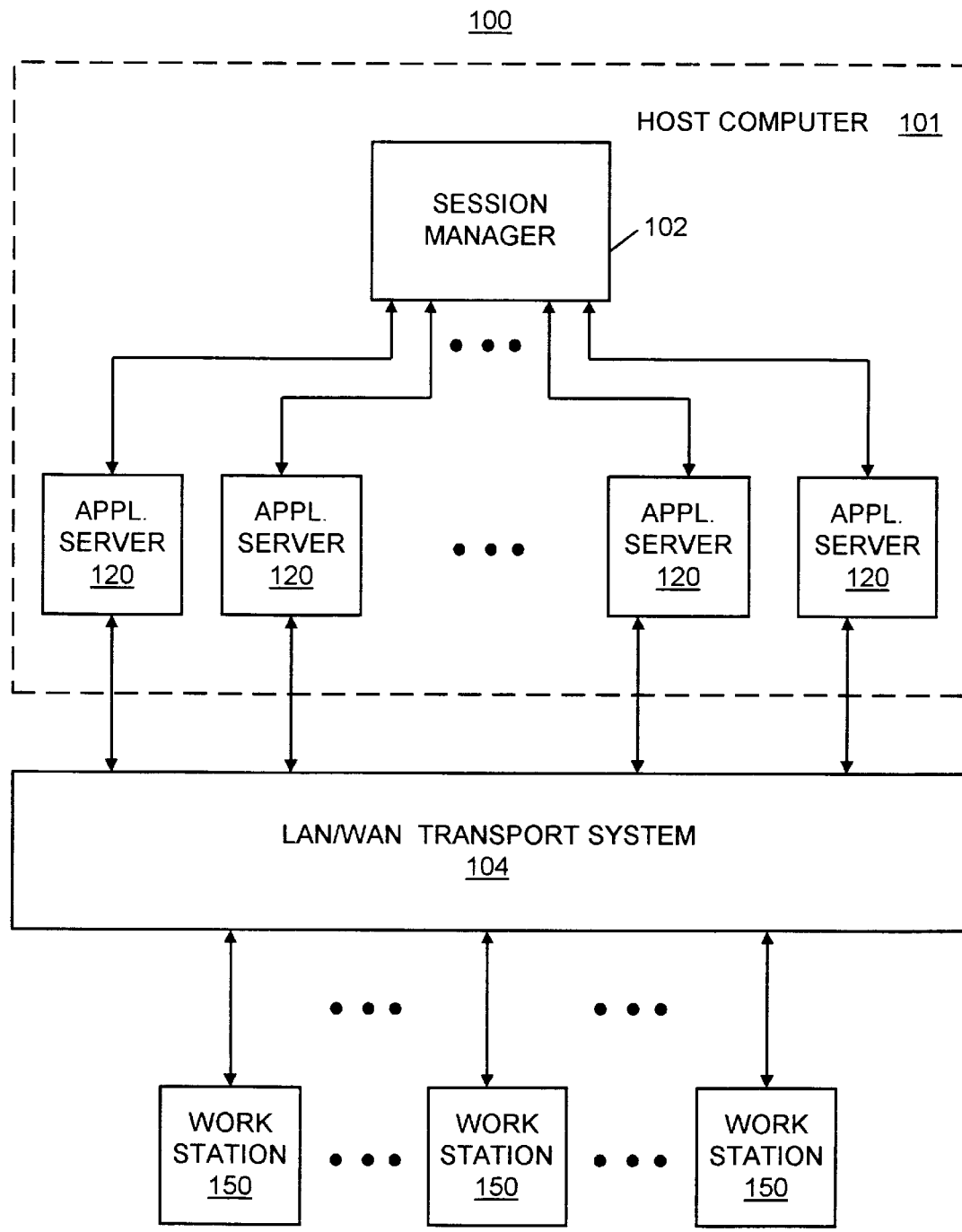
FIG. 1 is a schematic functional block diagram of a prior-art server-client network.

Referring to FIG. 1, client-server system 100 includes a host computer 101 having a session manager 102 that controls one or more virtual application servers 120. Each application server 120, for example, may be interfaced to a local area network (LAN) and/or to a wide area network (WAN) transport system 104 for two-way communication with one or more client workstations 150. Modern communication networks commonly use packet switching techniques for adaptively sharing the bandwidth of a given transmission medium. Because the client workstations do not execute the application code, session manager 102 supports the simultaneous execution of multi-user applications in host computer 101. Consequently, in order to make the role of the remote application server transparent to each client workstation, the client workstation resources (memory, storage disks, printers, video display screen, etc.) must be accessible by the application server.

Figure 2:
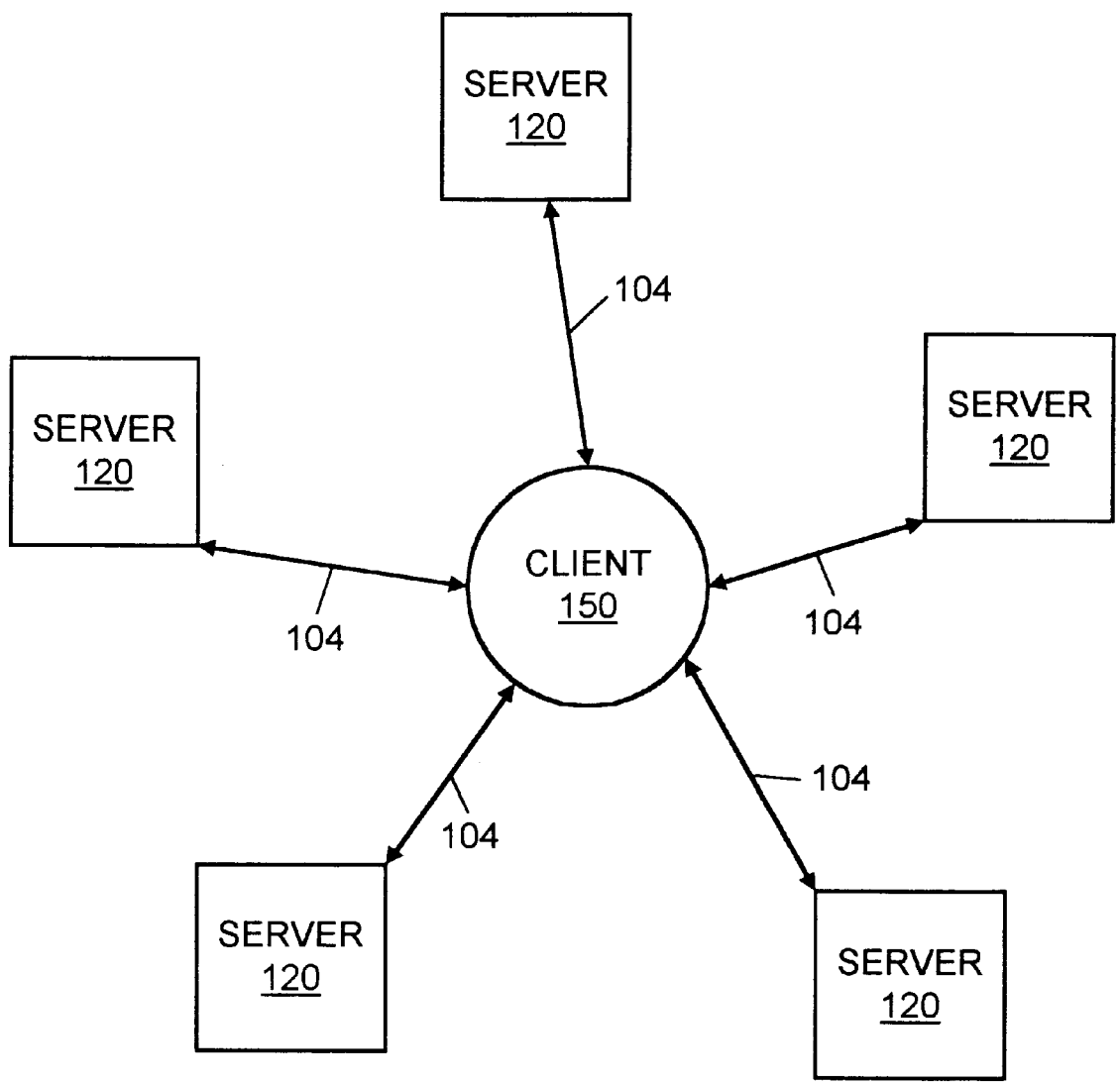
FIG. 2 is a schematic functional block diagram of a prior-art multiple-server single-client network.

Although the reliable event delivery system method of the present invention is applicable to the client server system of FIG. 1, the reliable event delivery system method is primarily intended for use in a client-server system 200 wherein the communication network connects a single client to a multiplicity of servers as shown in FIG. 2. Such a system configuration is useful for supporting a service and maintenance arrangement in which a remote service center (client workstation 150) provides on-call service to a number of facilities (servers 120) by responding to service requests received over one or more communication transport systems 104.

Figures 3, 4:
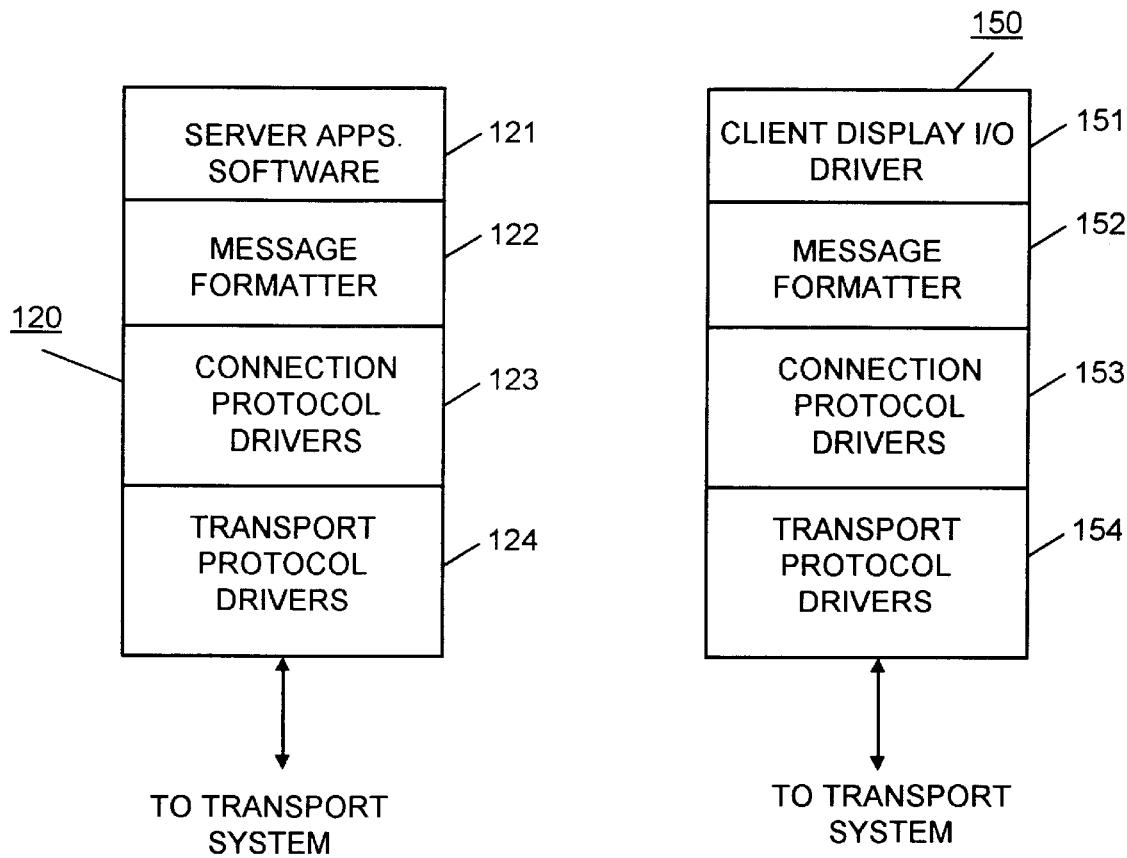
FIG. 3 is a schematic functional block diagram of an application server in accordance with the invention.
FIG. 4 is a schematic functional block diagram of a client workstation in accordance with the invention.

FIG. 3 shows the architecture of a typical application server 120 that includes server application software 121, message formatter 122, connector protocol drivers 123, and transportation protocol drivers 124. Server application software 121 executes the application process requested by the client workstation 150. Message formatter 122 implements the protocol for instructions to the client workstation 150 generated by server application software 121 and interprets messages sent by the client workstation as an input to the server application software process. Connection protocol drivers 123 apply and interpret any optional protocols such as data encryption, data compression, error control, and modem control. Transport protocol drivers 124 apply or interpret the protocols required for connecting to a selected transport system.

FIG. 4 shows the architecture of a typical client workstation 150 connected to the transport system used by both the application server and the workstation. Client I/O driver 151 provides input to and receives output from a client workstation application (not shown). Client I/O driver 151 may drive the client input and output (I/O) devices (e.g., video screen, keyboard, mouse). More particularly with reference to the present invention, I/O driver 151 provides an interface for messages (events, application data and other related messages) received from the application server for execution by a client workstation application. The client workstation application receives inputs (events) via the I/O driver 151 for processing. Message formatter 152, connection protocol drivers 153, and transport protocol drivers 154 respectively perform the same functions as application server protocol drivers 122, 123, and 124 of FIG. 2 (as described above).

It should be noted that the system elements making-up client workstation 150 (FIG. 4) may vary considerably. A highly specialized workstation may have a minimum of computational, memory, and graphics capabilities (e.g., an inventory data collection terminal may only have a simple input keyboard, alphanumeric display panel, and a minimum of local memory). More complex applications may require graphic object display support using bulk memory and video display. The simplest workstation will include the basic protocol levels shown in FIG. 4 to allow for communication with one or more application servers. It should be recognized that for clarity in presentation, one embodiment of a client workstation is described. Alternatively, other client workstation configurations may be utilized without departing form the true spirit of the present invention.

The architectural descriptions above show a high degree of similarity between the application server of FIG. 3 and the client workstation of FIG. 4. Because of this similarity, it should be recognized that the client workstation may also generate events that are transmitted to an associated application server for execution. For example, client workstation generated events may include a request for initiating or terminating an application, exercising a client option while running an application, or inputting data for the server's use. The type and variety of events generated by a client workstation will vary with the specific resources included such as the type of input/output devices. Therefore, it should be recognized that for clarity in presentation, the following description describes the invention in terms of an application server (or event generator) generating events for execution by a client workstation (event receptor). Alternatively, the client workstation can assume the role of the application server by generating events and the application server can assume the role of the client workstation by executing the client workstation generated event.

Figure 5:
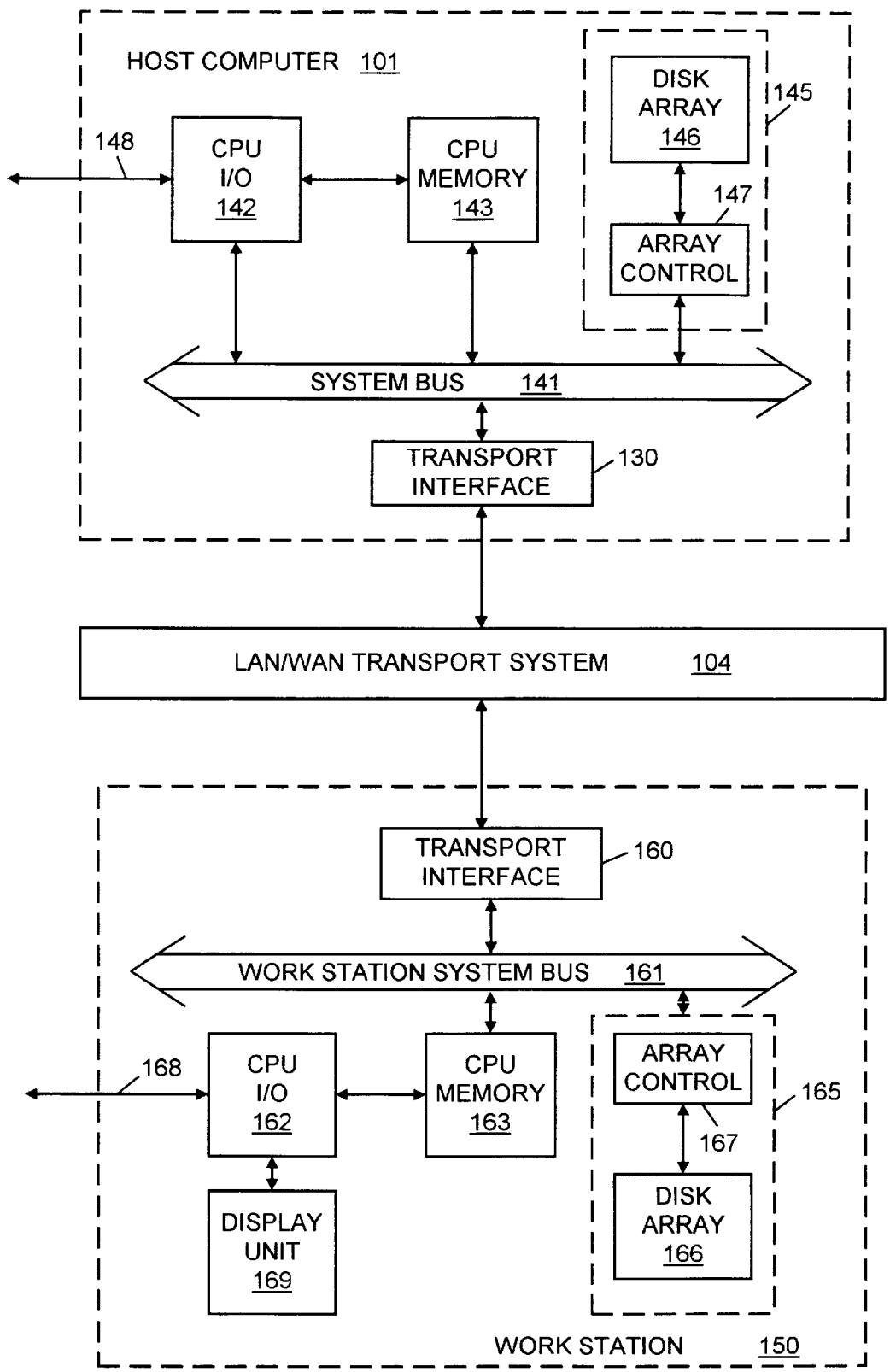
FIG. 5 is a schematic hardware architecture block diagram of a server-client system in accordance with the invention.

FIG. 5 is a schematic block diagram for a server-client system that includes a host computer 101 coupled to a LAN/WAN transport system 104 for communicating with one, or more, client workstations 150. Host computer 101 typically includes a CPU 142, CPU memory 143, and a memory array 145 interconnected by system bus 141. Memory array 145 includes a disk array 146 and disk controller 147. CPU 142 provides access to external devices that may include other transport systems, data and program entry devices, and system maintenance and test devices. Transport interface unit 130 provides the necessary logic level electrical connection to transport system 104.

Client workstation 150 is interfaced to transport system 104 by transport interface unit 160 that is functionally similar to host computer transport interface 130. Workstation system bus 161 interconnects CPU 162, CPU memory 163, and memory array 165 that is used for bulk storage of data such as graphical objects used in conjunction with the client workstation display unit 169. I/O interface 168 provides support for devices such as a keyboard, mouse, printer, test devices, and alternate transport systems.

In order to provide ideal application service to the remote client workstation, the remote processing performed at the remote application server should be transparent to the client. This requires that the communication process between the server and workstation be highly efficient. Efficiency of communication is governed by bandwidth and protocol. Given sufficient bandwidth for communicating data and control signals, the protocol for governing the procedures used in communicating determines the efficiency of the system. The governing protocols should ensure that the server will not be "hung-up" because of a failure to receive a required response, nor be hindered by uncertainties due to lack of feedback from a client workstation.

Application server resources can become hung-up if a response to an event sent to a workstation does not indicate to the server that the required action by the workstation was executed. This state of uncertainty may occur even if the transport protocol provides reliable communications by returning a message received acknowledgment to the server. The transport level protocol only provides assurances that the transmitted message was received at the client workstation transport driver 154 level (FIG. 4) and does not provide assurances that the transmitted message (event) was received and executed at the client workstation application level. Consider the example of FIG. 2, in which a facility (server 120) requiring servicing of a disk array sends an event message to the service center (client 150) requesting immediate service. Transmission of the event message over a transport system reliable protocol results in a confirmation that the event message was received at the client workstation 150 transport protocol level but would fail to advise the server that the event message was processed and that the service center has scheduled the necessary service call.

Time-out procedures (events) are commonly invoked so that the application server resources can be made available for other purposes if no response is received within a prescribed time interval. However, time-out events imply that a temporary storage capacity must be provided for storing any events for which execution at the client server has not been confirmed. The average amount of temporary storage needed by host computer (101) of FIG. 1 is equal to the product of the average number of time-out events accumulated per client workstation and the average number of client workstations being served during a given time period.

In order to minimize the amount of storage devoted to storing un-acknowledged events, and allow the host system to respond to abnormal conditions that may exist in a client workstation that prevent the client-server system from operating reliably, early detection of a failure to execute events at a given client workstation is required. System reliability can be improved by the server host computer initiating prompt corrective action at any defective workstation. For example, a defective disk drive in a client workstation disk array could be identified by failure of an event to gain access to the disk.

In order to provide timely feedback to the server for improved system reliability, the following basic protocol steps are invoked when an event is communicated by the application server: (1) the server uses a reliable transport protocol that delivers and acknowledges receipt of the message (packet) by the connection protocol driver 153 (FIG. 4) level; (2) the client workstation message protocol formatter 152 level (FIG. 4) interprets the received event message, passes it on to client workstation I/O unit 151 for execution by the client application, and, upon receiving an indication from the I/O unit that the event has executed, sends a properly formatted acknowledgment message back to the application server over the reliable transport system; and (3) the server receives the acknowledgment message and verifies the validity of the acknowledgment by confirming that the message conforms to the transport system protocol.

Figure 6:
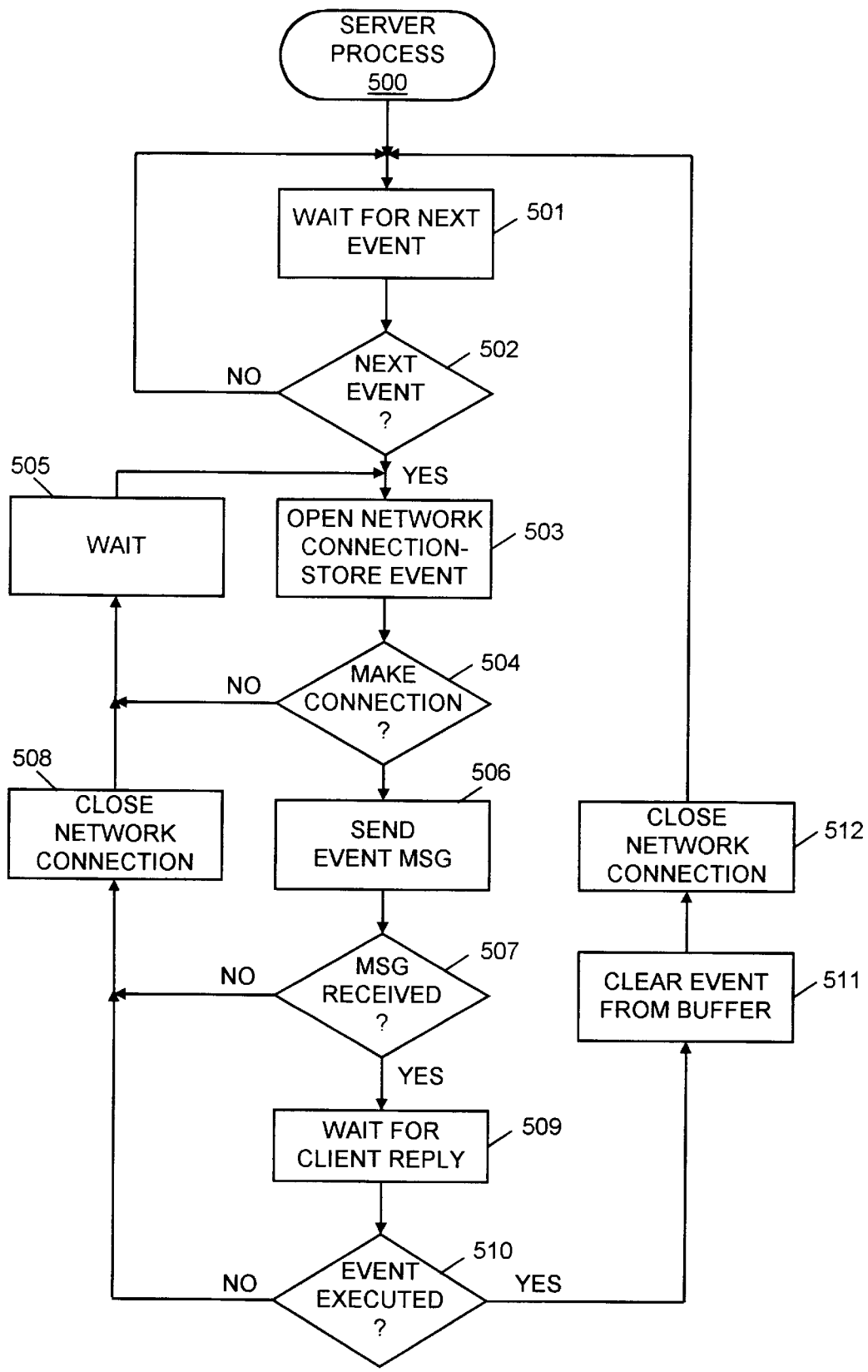
FIG. 6 is a detailed flow diagram for a method implemented in a server for reliable event delivery in accordance with the invention.
Figure 7:
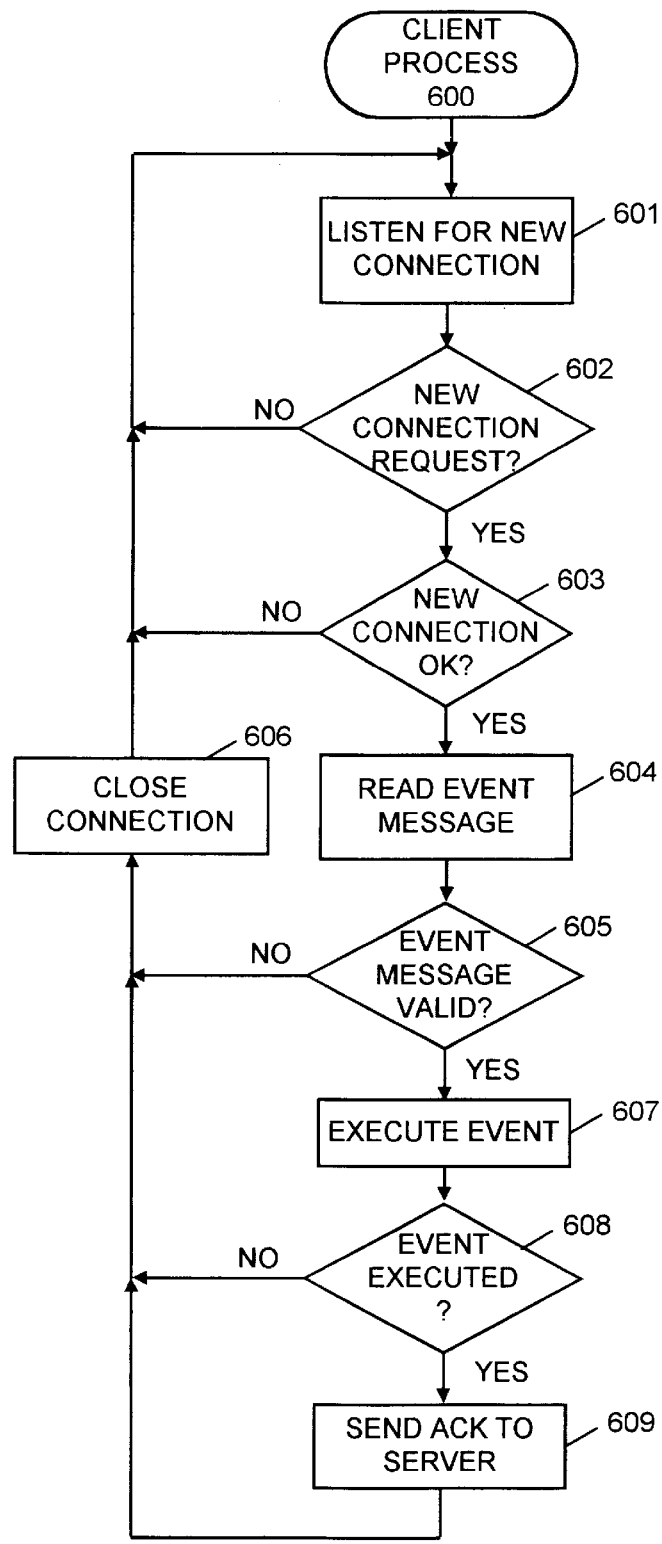
FIG. 7 is a detailed flow diagram of a method implemented by a client workstation for reliable event delivery in accordance with the invention.

FIGS. 6 and 7 are flow diagrams that describe the method outlined above in greater detail for the application server and the client workstation, respectively.

Referring to FIG. 6, server process 500 provides reliable event delivery. Typically, the server process initializes the parameters related to the operating system and to the event generator, such as client names, port addresses, retry time-outs, protocol type (TCP, KURL, etc.). After initialization, server process 500 enters a wait loop awaiting a server generated event, that includes wait step 501 and test step 502. The server may execute other processes concurrently with the execution of the server process described herein. Accordingly, during the wait step 501, the server may execute other processes and is not necessarily inactive during the execution of this process. The generation of an event can be considered to be an interrupt process, by which the server executes (or continues to execute) process steps upon receipt of the interrupt (in this case the received event). When the server generates an event in step 502, the server process moves to step 503 where the event message is stored in a temporary buffer while a transport system connection to the client is initiated. If, at step 504, the server determines that a successful connection has been established, the process transmits the event message to the client in step 506. Otherwise, the server process enters a wait loop that includes wait step 505 where a wait period prescribed by the governing transport system protocol is observed before attempting to open a connection again in step 503. Upon establishing a connection, the server sends the event message to the client in step 506 and then checks, in step 507, if the message was acknowledged as received. If not, the failed connection is terminated in step 508 and then enters the transport system protocol prescribed wait of step 505. If the message has been acknowledged as received in step 507, the server waits for prescribed time interval for the client to reply by sending an event-executed acknowledgment in step 509 that indicates that the event has been executed by the client. If, in step 510, the server determines that no acknowledgment of event execution has been received within a prescribed time interval, or if the received acknowledgment message fails to conform to the standards set by the transport system protocol and is inconsistent with the event message stored in the temporary buffer in step 503, the network connection is terminated in step 508. Otherwise, the executed event is cleared from the temporary buffer in step 511 and the network connection is terminated in step 512 before returning to step 501.

FIG. 7 shows client process 600, which provides the corresponding actions in the client workstation. The process enters a wait loop that includes steps 601 and 602 where the client monitors the transport system for a new connection request in step 601 and, if none is received, step 602 returns the process to step 601. Again, as described in connection with the server process, the client workstation may concurrently execute other processes and handle the receipt of an event as an interrupt, servicing such interrupts by executing the remaining portion of the client application process as described hereafter. If a new connection request is received, client process step 603 checks if the new connection is successfully established (in accordance with the transport system protocol) and, if so, the process moves to step 604 where the event message is read. Client process step 605 determines if the received event message is valid (conforms to the operating system requirements) and, if not, in step 606 the process closes the connection and then returns to step 601. Otherwise, the client workstation executes the event in step 607. The client workstation, upon confirming that the event has been executed (step 608), sends an event-executed acknowledgment message (step 609) to the server and then closes the connection in step 606 and returns the process to step 601. If the event has not been successfully executed, the process in step 608 goes to step 606 and terminates the connection and then returns to step 601 without sending an event-executed acknowledgment.

Referring again to FIG. 5, a server-client system may use the reliable event delivery system described above in order to guarantee communication between an application server having a redundant array of independent discs (RAID set) and a client workstation that provides maintenance services to the application server. In such a system, array controller 147 is a RAID controller and is used in conjunction with a RAID set (disk array 147). Upon a failure in the RAID set, the RAID controller (or other application server component) generates an event indicating the failed disk condition. The host computer 101 (application server) uses a reliable transport protocol that delivers and acknowledges receipt of the event at the client workstation 150. The client workstation interprets the received event message, passes it on to a client workstation application (via an interrupt or other means through I/O unit 151 (FIG. 4)) which is responsible for the maintenance service of the host computer 101. The event is communicated and acknowledged (at the transport level) via the transport system connecting the host computer 101 and client workstation 150. Thereafter, the client workstation application responsible for maintenance may act upon the received event. Once the event is acted upon (executed) by the client workstation application, a properly formatted event-executed acknowledgment message is sent back to the application server over the transport system. Finally, the host computer 101 verifies the validity of the acknowledgment by confirming that the message conforms to the transport system protocol. In the event the message does not conform, the host computer can continue to deliver event messages to the client workstation indicating that the RAID set requires maintenance. In one embodiment, host computer 101 retransmits events to client workstation 150 after a predetermined timeout in the event a properly formatted event-executed acknowledgment message is not returned. Alternatively, host computer 101 may execute another process or communicate the event to another client workstation.

A rogue proxy server may cause a spurious event to be received by a client. In the case of the service and maintenance system discussed previously (FIG. 2), a system "hacker" could generate one or more false event messages requesting services resulting in the service center unnecessarily committing resources to the false requests.

Figure 8:
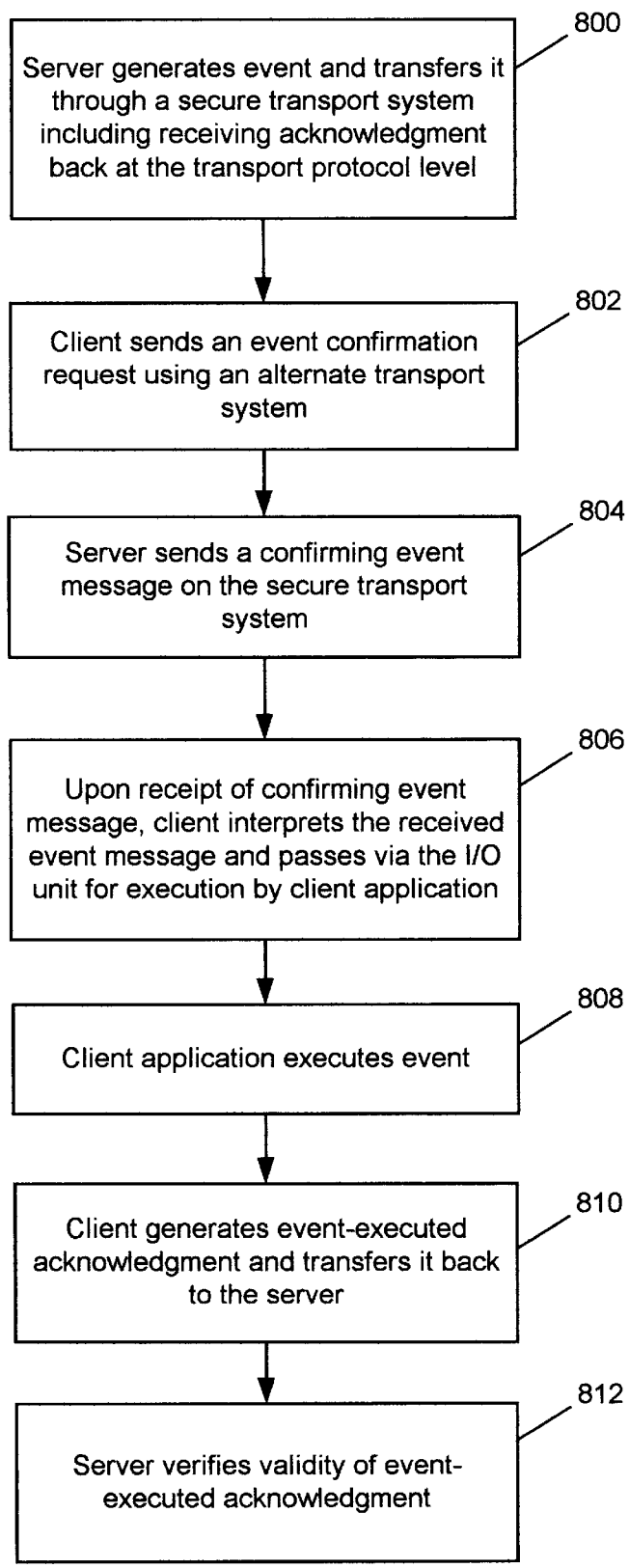
FIG. 8 is a flow diagram for implementing secure reliable event delivery in a server-client system in accordance with the invention.

Referring to FIG. 8, in a secure reliable event delivery system, an additional confirmation in the typical client or server process is provided to assure system security. In a secure reliable event delivery system, a server generates an event and transfers the same through a reliable transport protocol that delivers and acknowledges receipt of the event (message) by the connection protocol driver in step 800. Upon receipt, the client sends an event confirmation request message using an alternate transport system in step 802. The alternate transport system is used to assure event integrity by verifying the event generator. The alternate transport system provides an independent data path (independent in the sense that it is distinct from the data path utilized by the reliable transport system used to transport the event) between the application server and the client workstation. If the event generator can not be verified, then the event will not be processed. The alternate transport system may reside in the same network. However, measures must be utilized to assure that the identity of the event generator is confirmed. The alternate transport system may include separate lines or links to each application server or a separate LAN/WAN system for providing such verification services. In one embodiment of the present invention, the alternate transport system is a second reliable transport system.

The server, upon receipt of the confirmation request, sends a confirming event message on the reliable transport system in step 804. Upon receipt of the confirming event in step 804, the client workstation message protocol formatter interprets the received event message, passes it on to client workstation I/O unit 151 (FIG. 4) for execution by a client application in step 806, and, upon receiving an indication from the I/O unit that the event has executed in step 808, sends a properly formatted event-executed acknowledgment message back to the application server over the reliable transport system in step 810. The server receives the acknowledgment message and verifies the validity of the acknowledgment by confirming that the message conforms to the transport system protocol in step 812.

The present invention has been described in terms of specific embodiments, which are illustrative of the invention and not to be construed as limiting. Other embodiments are within the scope of the following claims.

What is claimed is:

1. A method of reliable event delivery in a distributed event driven system in which one or more servers are each connected by a reliable transport system to a client station, the method comprising the steps of:

communicating an event message over a reliable transport system from a server to a client station for execution;

acknowledging receipt of the event message at the client station at a client station transport protocol level;

delivering the event message to a client station execution level;

acknowledging the execution of the event message by providing an event-execution acknowledgment back to the server to reduce the likelihood of a server hang-up condition.

2. The method of claim 1 wherein the step of communicating the event message includes storing the event message in the server and upon receipt of a corresponding event-execution acknowledgment removing the stored event message.

3. The method of claim 1 further including the steps of:

providing a second transport system for communicating between the server and the client station;

prior to delivering the event message to the client station execution level, sending a confirmation request to the server on the second transport system; and acknowledging the confirmation request by sending a confirming event message from the server to the client station on the reliable transport system.

4. A method for reliable delivery of an event in a distributed processing system having an application server and a client workstation comprising the steps of:

sending an event message from the application server to the client workstation on a reliable transport system having a reliable transport system protocol for delivering and acknowledging receipt of the event message at a client workstation's protocol driver level;

receiving the event message at the client workstation, interpreting the received event message, and sending an event-executed acknowledgment message back to the application server on the reliable transport system to reduce the likelihood of a server hang-up condition; and receiving and verifying, by the application server, validity of the event-executed acknowledgment message by confirming that the event-executed message conforms to the reliable transport system protocol.

5. The method of claim 4 wherein the step of sending an event further comprises:

generating an event message for delivery to the client workstation in response to an event;

storing the event message;

attempting to establish a connection to the client workstation;

if successful in establishing the connection, sending the event message; and if not successful in establishing the connection, attempting to again establish a connection in accordance with the reliable transport system protocol.

6. The method of claim 5 wherein the step of receiving and verifying the event-executed acknowledgment message further comprises:

waiting by the application server for the event-executed acknowledgment message and, upon receiving an event-executed acknowledgment message from the client workstation, clearing the stored event in the application server and closing the connection; otherwise closing the connection and attempting to again establish a connection in accordance with the reliable transport system protocol for retransmission of the event message.

7. The method of claim 4 wherein the step of receiving the event message includes storing the event and upon receipt of a corresponding event-execution acknowledgment removing the stored event message.

8. The method of claim 4 wherein the step of receiving the event message and sending an event-executed acknowledgment message further comprises:

listening by the client workstation for a connection request on the reliable transport system;

upon receiving the connection request, establishing a requested connection;

receiving, validating, and interpreting the event message; and sending an event-executed acknowledgment message to the application server.

9. The method of claim 4 wherein the step of receiving and verifying the event-executed acknowledgment message further comprises:

waiting by the application server for the event-executed acknowledgment message and, upon receiving the event-executed acknowledgment message from the client workstation, clearing the stored event message in the application server and closing the connection; otherwise closing the connection and attempting to again establish a connection in accordance with the reliable transport system protocol for retransmission of the event message.

10. A method for process to process communication between a process running on a server computer that sends and receives events to and from a process running on a client computer, the method comprising the steps of:

sending an event message from the server computer to the client computer on a first reliable transport system;

upon receiving the event message, sending, from the client computer, a confirmation request on a second transport system requesting the server computer to confirm the event message;

upon receiving at the server computer the confirmation request, sending a confirming event message over the first reliable transport system;

upon receiving the confirming event message at the client computer, executing the event message, and sending an event-executed acknowledgment message back to the server computer over the first reliable transport system to reduce the likelihood of a server hang-up condition; and upon receiving the event-executed acknowledgment message at the server computer, verifying the validity of the event-executed acknowledgment message by confirming it conforms to a first reliable transport system protocol associated with a first reliable transport system.

11. The method of claim 10 wherein the second transport system is a reliable transport system.

12. The method of claim 10 wherein the step of sending an event message further comprises:

awaiting, by the server computer, generation of an event for delivery to a client computer;

generating an event message in response to a generated event;

storing the event in the server computer;

attempting to establish a connection to the client computer;

if successful in establishing the connection, sending the event message; and if not successful in establishing the connection, attempting to again establish a connection in accordance with the first reliable transport system's protocol.

13. The method of claim 10 wherein the step of sending a confirmation request further comprises:

listening, by the client computer, for a connection request on the first reliable transport system;

upon receiving the connection request, establishing a requested connection;

validating and interpreting the event message for the event to be executed; and sending a confirmation request over a second reliable transport system for confirming that the event message was received.

14. The method of claim 10 wherein the step of verifying the validity of the event-executed acknowledgment message further comprises:

upon receiving by the server computer the event-executed acknowledgment message, the server computer clearing the stored event and closing the connection to the client computer;

if no event-acknowledgment is received within a predetermined timeout, closing the connection to the client computer and attempting to again establish a connection for retransmission of the event message in accordance with the first reliable transport system's protocol.

15. A distributed process system comprising:

a client workstation;

a reliable transport system; and an application server including an event generator for generating event messages for execution in the client workstation, a message protocol driver for formatting and interpreting event messages, and a transport system protocol driver connected to the reliable transport system for requesting execution of an event by the client workstation by communicating event messages to the client workstation over the reliable transport system; and wherein the client workstation includes a transport system protocol driver connected to the reliable transport system and an input/output device driver for receiving events to be executed by a client workstation application, the client workstation application operable to execute events and generate acknowledgment messages that are sent to the application server upon receipt of an event message and execution of an associated event to reduce the likelihood of an application server hang-up condition.

16. The distributed process system of claim 15 wherein the application server further includes a buffer memory for storing information descriptive of each event message.

17. A method for reliable delivery of an event between an event generator and an event receptor comprising the steps of:

sending an event message from the event generator to the event receptor on a reliable transport system, including delivering and acknowledging receipt of the event at an event receptor's reliable transport system protocol driver level;

receiving the event message at the event receptor, interpreting the received event message, and sending an acknowledgment message back to the event generator over the reliable transport system to reduce the likelihood of an event generator hang-up condition; and receiving and verifying, by the event generator, the validity of the acknowledgment message by confirming that the acknowledgment message conforms to a reliable transport system protocol.

18. The method of claim 17 wherein the step of sending an event message further comprises:

generating an event message responsive to receipt of an event;

storing the event;

attempting to establish a connection to an event receptor;

if successful in establishing the connection, sending the event message; and if not successful in establishing the connection, attempting to again establish a connection in accordance with the reliable transport system protocol.

19. The method of claim 18 wherein the step of receiving and verifying further comprises:

waiting by the event generator for the event-executed acknowledgment message and, upon receiving the event-executed acknowledgment message from the event receptor, clearing the stored event in the event generator and closing the connection;

closing the connection and attempting to again establish a connection in accordance with the reliable transport system protocol for retransmission of the event message upon non-receipt of the event-executed acknowledgment within a predetermined timeout period.

20. The method of claim 17 wherein the step of receiving the event message further comprises:

listening by the event receptor for a connection request on the reliable transport system;

upon receiving the connection request, establishing the requested connection;

receiving, validating, and interpreting the event message; and sending an acknowledgment message to the event generator.

21. A method of reliable event delivery in a distributed event driven system, the system including a server having a RAID array and a client workstation for servicing the RAID array in the event of a failure in the array, the method comprising the steps of:

detecting a failure in the RAID array;

generating an event message in response to the failure at the server;

communicating the event message over a reliable transport system from the server to a client station for execution;

acknowledging receipt of the event message at the client station at a client station transport protocol level;

delivering the event message to a client station execution level;

acknowledging the execution of the event message by providing an event-execution acknowledgment back to the server to reduce the likelihood of a server hang-up condition.

* * * * *